United States Patent [19]
Pike

[11] 3,906,803
[45] Sept. 23, 1975

[54] COMBINATION MECHANICAL VIBRATOR AND STETHOSCOPE

[75] Inventor: Victor E. Pike, Cincinnati, Ohio

[73] Assignee: The United States of America as represented by the Secretary of the Air Force, Washington, D.C.

[22] Filed: July 9, 1974

[21] Appl. No.: 486,802

[52] U.S. Cl. ................................. 73/552
[51] Int. Cl. ........................................ G01n 29/00
[58] Field of Search ............ 73/67, 67.1, 67.2, 67.4, 73/69, 70, 71.5 R, 12, 552, 553, 554, 555; 181/135, 136, 137

[56] References Cited
UNITED STATES PATENTS
2,412,240  12/1946  Williams et al. ........................ 73/67
3,550,434  12/1970  Schroeer et al. ..................... 73/67.2

Primary Examiner—Richard C. Queisser
Assistant Examiner—John S. Appleman
Attorney, Agent, or Firm—Joseph E. Rusz; Arsen Tashjian

[57] ABSTRACT

A modified eddy sonic stethoscope probe for use in the non-destructive testing of materials by imparting mechanical energy to the material causing it to vibrate and emit detectable sound waves which can be listened to with the stethoscope. A piece of expanded synthetic resinous material sold under the trademark Styrofoam is positioned between the outside of a solenoidal coil used as a doorbell type ringer and a flexible listening tube thereby effectively insulating the two elements. The armature is retained in the coil with silicone rubber to allow free movement along the longitudinal axis. A surgical boot isolates the listening tube from the workpiece.

4 Claims, 2 Drawing Figures

COMBINATION MECHANICAL VIBRATOR AND STETHOSCOPE

BACKGROUND OF THE INVENTION

This invention relates to a means for the non-destructive testing of materials and, more particularly, the invention is concerned with providing an improved device for evaluating the integrity of a bonded material by listening with a stethoscope to the sounds emitted when a workpiece is caused to vibrate by mechanical energy from an exciter.

A particular need for this invention exists where it becomes necessary to test composite articles such as laminates which are used in the construction of an abradable seal on the containment ring shroud of a jet aircraft engine. The invention is also useful for the detection of subsurface porosity caused by air entrapment in a filled honeycomb construction. While the invention has utility for a wide variety of diverse purposes and with different materials and structural configurations, it will be described for the sake of illustration in terms of the inspection for delamination of the abradable seal on a fan containment ring shroud for a jet engine.

Since the abradable seal is a non-conductor of electricity, it cannot be excited into localized vibration by eddy currents such as are utilized for testing aluminum face sheet bondment. Instead, it is necessary to provide an exciter which imparts sufficient mechanical energy to the test piece, which in this case is a seal, to cause it to vibrate and hence emit detectable sound waves which can be listened to with a stethoscope. This, in effect, would be a sophistication of the classical "coin tap" method which heretofore has been utilized for testing bond integrity or the like.

Heretofore, in the testing of metallic faced laminates, it has been the practice to use a toroidal ferrite core with the conductor wound in such a manner as to present a solenoidal coil with a hole through the center in the longitudinal axis. The "listening tube" of a stethoscope was then secured in the hole to provide a closed sound path from the center of the excited area to the ear. Although this last described system is satisfactory for metallic face sheets on either metallic or non-metallic substrates or cores, it is not useable to test the condition of non-metallic face sheets because the non-metallic face sheet is a non-conductor of electricity and therefore, cannot be excited into localized vibration by eddy currents directly. Thus, it is necessary to provide a system which will impart sufficient mechanical energy to the workpiece to cause it to vibrate and emit detectable sound waves.

SUMMARY OF THE INVENTION

The present invention provides an improved eddy sonic stethoscope for use in evaluating the integrity of both metallic and non-metallic face sheets on either metallic or non-metallic substrates or cores. An interchangeable excitation probe is provided, depending on the electrical conductivity of the workpiece, in place of the listening tube which is instead positioned on the outside of the coil with a piece of expanded synthetic resinous material sold under the trademark Styrofoam between the side of the listening tube and the side of the coil. Th excitation probe, which functions as an armature, is retained in position with silicone rubber allowing it to move freely along its longitudinal axis. The listening tube is isolated from the workpiece by means of a surgical rubber boot.

Accordingly, it is an object of the invention to provide a non-destructive testing procedure wherein the integrity of non-metallic bonded material can be accurately evaluated.

Another object of the invention is to provide a eddy sonic stethoscope wherein sufficient mechanical energy is imparted to the workpiece to cause it to vibrate and emit detectable sound waves.

Still another object of the invention is to provide an eddy sonic stethoscope wherein a thickness of Styrofoam is interposed between the outside of the coil and the listening tube to isolate the elements.

A further object of the invention is to provide an eddy sonic stethoscope which includes an interchangeable excitation probe to allow the basic system to be utilized for both metallic and non-metallic face sheets on either metallic or non-metallic substrates or cores.

A still further object of the invention is to provide an eddy sonic stethoscope wherein a surgical rubber boot is fitted over the lower end of the listening tube thereby allowing it to be placed in direct contact with the inspection surface without causing undue restraint on surface displacement. Also, the boot acts to isolate any unwanted direct pressure waves coupled from the armature along the inspection surface.

These and other objects, features and advantages will become more apparent after considering the following detailed description taken in conjunction with the annexed drawings and appended claims.

DESCRIPTION OF A PREFERRED EMBODIMENT

Figure 1:
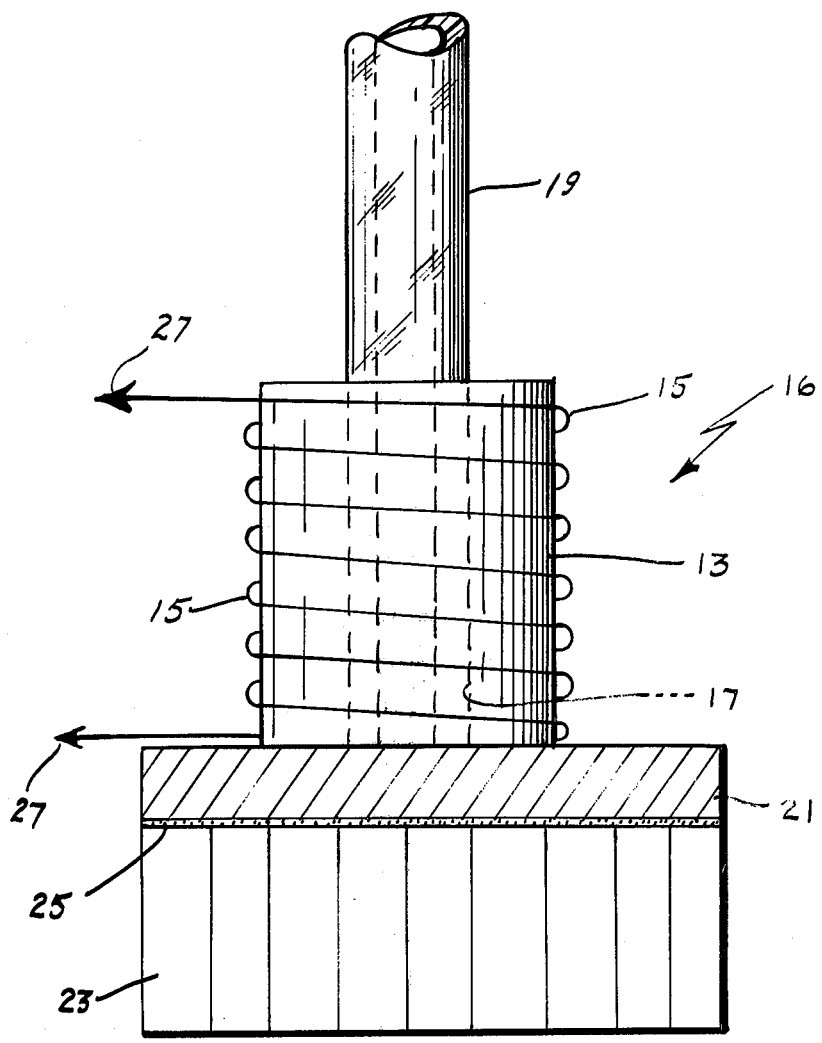
FIG. 1 is a view in partial cross-section of a prior art eddy sonic stethoscope shown in use with a metallic face sheet and a non-metallic core.

Referring now to the drawings, in FIG. 1 there is shown an eddy sonic stethoscope which is presently in use for the evaluation of aluminum sheet bondment or the like. The excitation probe includes a toroidal ferrite core 13 with a conductor 15 wound in such a manner as to present a solenoidal coil 16 with a hole 17 through the center in the longitudinal axis. The listening tube 19 of the stethoscope is secured in the hole 17 thus providing a closed sound path from the center of the excited area to the ear.

A typical workpiece for testing by the prior art stethoscope as shown in FIG. 1 includes a thin metallic face sheet 21 which is bonded to a honeycomb core 23 with the bond interface 25. The conductor 15 of the solenoidal coil 16 is connected to an eddy current excitation source at the arrows 27 causing the metallic face sheet 21 to become excited into localized vibration from the eddy currents in the core 13. The sounds from the excited area can be heard through the listening tube 19 thereby allowing one with a trained ear to determine the integrity of the bond interface 25.

Although the eddy sonic stethoscope shown in FIG. 1 is suitable for testing metallic face sheet bondment or the like, it cannot be used with non-metallic faced composite materials. For example, assume that it is required to perform a non-destructive test on the abradable seal on the fan containment ring shroud of a jet engine in order to determine the condition of the seal to containment ring bond after the part has had operational service exposure. Since the abradable seal is a non-conductor of electricity, it cannot be excited into localized vibration by eddy currents directly such as are utilized for the aluminum face sheet bondment.

Figure 2:
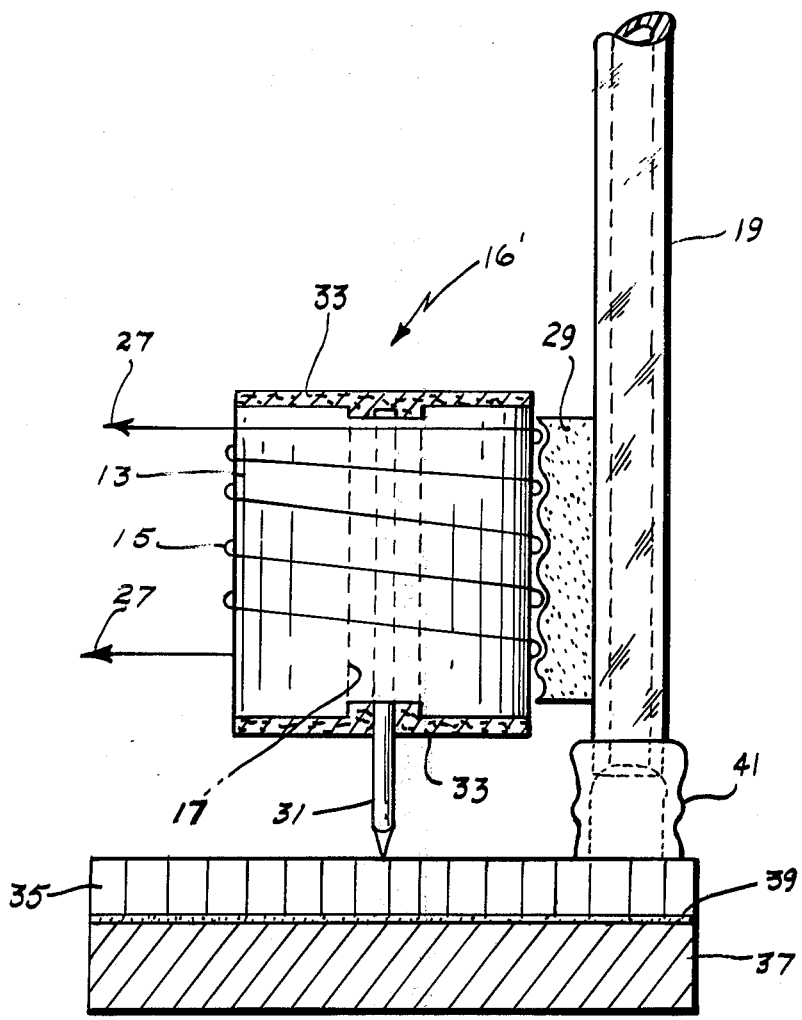
FIG. 2 is a view in partial cross-section of an eddy sonic stethoscope according to the invention shown in use with a non-metallic seal bonded to a metallic ring.

In the new and improved eddy sonic stethoscope shown in FIG. 2, the listening tube 19 is removed from the hole 17 in the core 13 and positioned beside the coil 16' and spaced therefrom with a Styrofoam insert 29 interposed therebetween. A permanent magnetic rod armature 31 is axially disposed in the center hole 17 and includes a tapered lower end which extends downwardly from the coil 16' to contact the surface of the workpiece. The rod 31 is retained concentrically in positon by the silicone rubber elements 33 which are adhesively attached to the rod 31 and top and bottom surface of the coil 16'. The resulting coil 16' configuration then takes the form of a door bell type ringer permitting mechanical excitation of the workpiece which, in the embodiment of FIG. 2, includes a non-metallic abradable seal 35 bonded to a metallic containment ring 37 by means of the bond interface 39.

In order to keep background noise to a minimum and hence increase signal-to-noise ratio, there are certain considerations which must be observed. Since the human ear is extremely sensitive to small pressure changes, any unwanted vibration coupled directly to the listening tube results in excessive background noise. The permanent magnet armature 31 is the only moving member of the probe system and, hence, the main contributor of background noise. By retaining the armature 31 in the excitation coil 16' with the silicone rubber elements 33, it is relatively free to move along its longitudinal axis. At the same time, the silicone rubber elements 33 allow very little of the vibration of armature 31 to be coupled directly to the coil 16' and, hence, to the listening tube 19.

The listening tube 19 is further isolated mechanically from the moving armature 31 by interposing a piece of Styrofoam 29 between the tube 19 and the outside of the coil 16' to which it is attached. As an added precaution, the listening tube 19 is fitted with a surgical rubber boot 41. This boot 41 allows the listening tube 19 to be placed in direct contact with the inspection surface 35 without causing undue restraint on surface displacement. At the same time any unwanted direct pressure waves coupled from the armature 31 along the inspection surface 35 are isolated from the listening tube 19 by the boot 41.

Thus it can be seen that the new and improved eddy sonic stethoscope shown in FIG. 2 is, in effect, a door bell ringer type exciter which is capable of imparting sufficient mechanical energy to a workpiece, especially one having a non-metallic face, to cause it to vibrate and thereby emit detectable sound waves which can be listened to with the stethoscope. By providing an interchangeable excitation probe 31, the basic system hereinbefore described can be utilized for both metallic and non-metallic face sheets on either metallic or non-metallic substrates or cores.

Although the invention has been illustrated in the accompanying drawings and described in the foregoing specification in terms of a preferred embodiment thereof, the invention is not limited to this embodiment or to the configuration mentioned. It will be apparent to those skilled in the art that other uses can be made of the hereinbefore described eddy sonic stethoscope, such as, for example, in the detection of subsurface porosity caused by air entrapment in a filled honeycomb structure.

Having thus set forth and disclosed the nature of my invention, what I claim and desire to secure by Letters Patent of the United States is:

1. An eddy sonic stethoscope for the non-destructive testing of a workpiece with a non-metallic outer surface, said eddy sonic stethoscope comprising a solenoidal coil spaced above the surface of the workpiece and including a toroidal ferrite core having an axially oriented central opening therethrough and a conductor wire wound around the outside of said core, said conductor wire being operatively connected to an eddy current excitation source, a listening tube in parallel relationship to and spaced from the outer side surface of said solenoidal coil and extending upwardly from the surface of the workpiece, means for isolating said listening tube from said solenoidal coil, a permanent magnetic rod armature disposed axially through the central opening of said solenoidal core and extending downwardly therefrom to contact the surface of the workpiece, and means for retaining said armature rod in position in the central opening in said ferrite core while allowing said armature rod to move freely along its longitudinal axis in response to eddy currents in said solenoidal coil thereby transferring mechanical energy to the workpiece causing it to vibrate and produce sounds which can be heard through the listening tube.

2. The eddy sonic stethoscope defined in claim 1 wherein the means for isolating said listening tube from said solenoidal coil includes a thickness of expanded synthetic resinous material positioned between said listening tube and said solenoidal coil.

3. The eddy sonic stethoscope defined in claim 2 wherein the means for retaining said armature rod in position in the central opening in said ferrite core includes a pair of silicone rubber elements adhesively attached to the top and bottom surfaces of said solenoidal coil, said armature rod being concentrically held by adhesive attachment to said silicone rubber elements to allow substantially free axial movement along its longitudinal axis in response to the eddy currents in said solenoidal coil.

4. The eddy sonic stethoscope defined in claim 3 wherein a surgical rubber boot is positioned between the lower end of the listening tube and the surface of the workpiece thereby effectively isolating any unwanted direct pressure waves coupled from the armature rod along the workpiece surface to the listening tube.

* * * * *